United States Patent [19]

Sugawara et al.

[11] Patent Number: 5,491,560
[45] Date of Patent: Feb. 13, 1996

[54] APPARATUS FOR AND METHOD OF RECORDING HIGH RESOLUTION IMAGE, AND APPARATUS FOR AND METHOD OF REPRODUCING THE SAME

[75] Inventors: Kazuaki Sugawara; Hideo Ito, both of Tokyo, Japan

[73] Assignee: Pioneer Electronic Corporation, Tokyo, Japan

[21] Appl. No.: 53,459

[22] Filed: Apr. 27, 1993

[30] Foreign Application Priority Data

Apr. 30, 1992 [JP] Japan .................................. 4-111450

[51] Int. Cl.$^6$ ........................................... H04N 5/91
[52] U.S. Cl. .......................... 358/342; 360/9.1; 360/11.1; 360/35.1
[58] Field of Search .............................. 369/47; 358/342, 358/335, 11, 313; 348/389; 360/9.1, 35.1, 11.1, 33.1, 32

[56] References Cited

U.S. PATENT DOCUMENTS

| | | | |
|---|---|---|---|
| 3,470,315 | 9/1969 | Kihara | 360/11.1 |
| 3,803,352 | 4/1974 | Goldberger | 348/458 X |
| 4,485,401 | 11/1984 | Tan et al. | 348/389 |
| 4,774,599 | 9/1988 | Baumeister | 360/11.1 |
| 4,939,586 | 7/1990 | Nabati et al. | 358/342 |
| 5,111,303 | 5/1992 | Senso et al. | 358/335 |
| 5,128,750 | 7/1992 | Katagiri et al. | 348/458 X |

Primary Examiner—W. R. Young
Attorney, Agent, or Firm—Kane, Dalsimer, Sullivan, Kurucz, Levy, Eisele and Richard

[57] ABSTRACT

An apparatus for recording high resolution image data, which is inputted from the external at a predetermined timing, to a recording medium of random access type, is provided with: a memory for storing at least one high resolution image data by a unit of picture plane on the basis of a record control signal; a device coupled to the memory, for dividing and converting the high resolution image data stored in the memory into a plurality of standard image data corresponding to a standard television system one after another; a recording device coupled to the dividing and converting device, for recording the plurality of standard image data to the recording medium by a unit of field or frame; and a control device for generating the record control signal, which corresponds to the predetermined timing of the high resolution image data.

8 Claims, 9 Drawing Sheets

3A

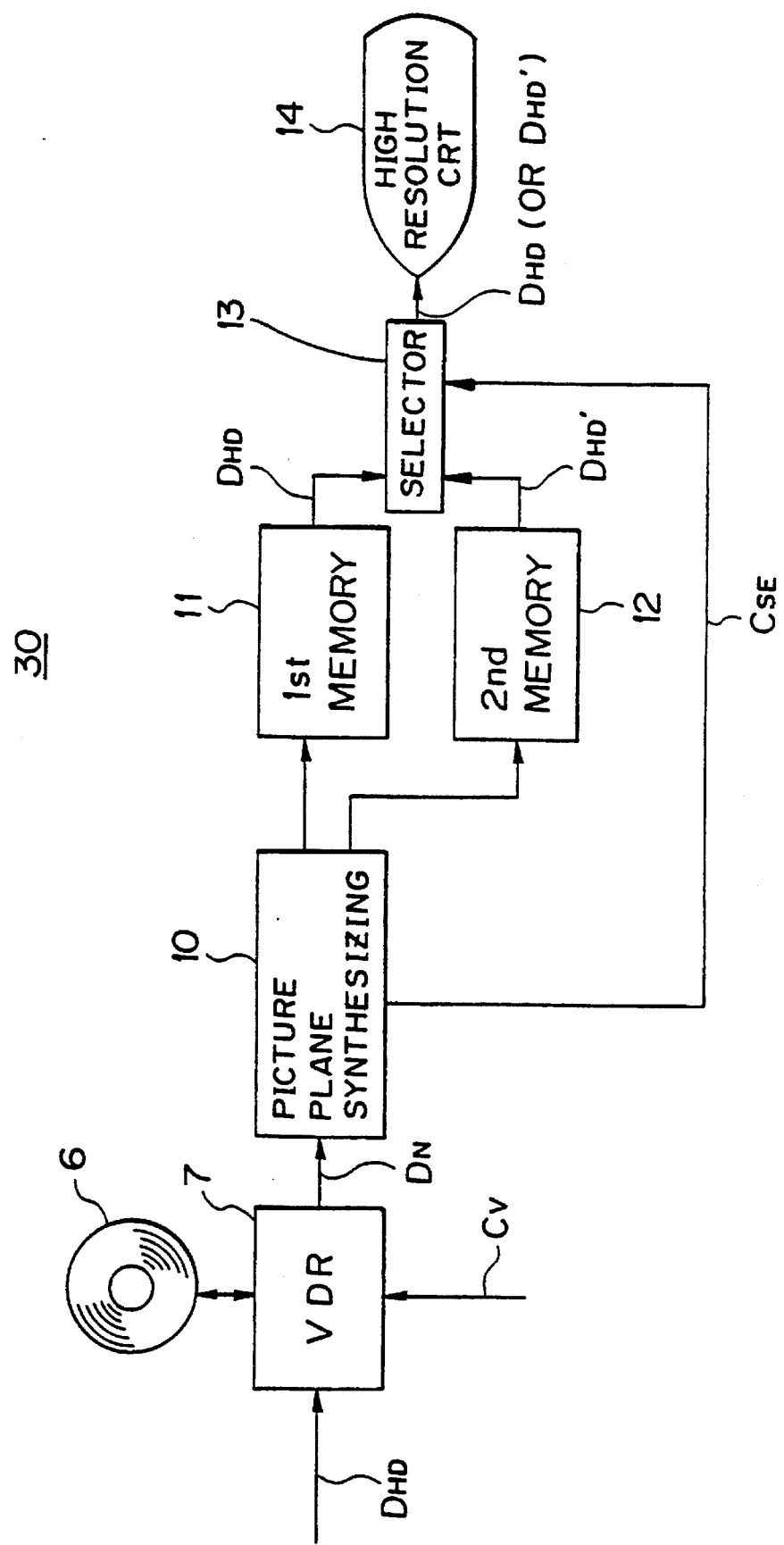

APPARATUS FOR AND METHOD OF RECORDING HIGH RESOLUTION IMAGE, AND APPARATUS FOR AND METHOD OF REPRODUCING THE SAME

BACKGROUND OF THE INVENTION

1. Field of the Invention

The present invention is related with a technique for recording a dynamic image and a still image, such as a TV (Television) picture plane, by means of a picture plane dividing technique, and reproducing it. Especially, the present invention is related with an apparatus for and a method of recording a high resolution image, which divide the high resolution picture planes, such as computer graphics etc., and convert them into the picture planes of the standard television system, such as NTSC (National Television System Committee), PAL (Phase Alternation by Line), and SECAM (Sequential and Memory i.e. French and Soviet television system), and also an apparatus for and a method of reproducing thus recorded picture planes.

2. Description of the Related Art

A high resolution picture plane is recorded and reproduced as follows by use of a recording and reproducing apparatus of the standard television system.

Namely, the high resolution picture plane is divided into a plurality of picture planes, and are converted by a plurality of D/A (Digital to Analog) converters, respectively, so as to be recorded and reproduced in parallel by a plurality of recording and reproducing apparatuses of the standard television system.

However, when reproducing the high resolution picture plane on a display device of the standard television system by use of a plurality of the above mentioned recording and reproducing apparatuses, it is necessary to display it by a plurality of display devices.

There is another system, which divides the high resolution images into a plurality of signals of the standard television system, and records them in a time divisional manner to a continuous recording medium such as a video tape, for example.

However, in this case, since the recording operation is to be performed continuously, the recording medium enough for the recording time is required. Further, since means for cutting out and outputting each divided picture plane, cannot be shared, this means is separately required for each of the divided pictures.

Accordingly, there is a problem that the construction of the apparatus becomes large-scaled and the cost thereof is increased, in the above mentioned related art apparatus.

SUMMARY OF THE INVENTION

It is therefore an object of the present invention to easily record and reproduce the high resolution image by use of recording and reproducing apparatuses of the standard television system, which are rather simple and low in cost.

According to the present invention, the above mentioned object can be achieved by a first apparatus for recording high resolution image data, which is inputted from the external at a predetermined timing, to a recording medium of random access type. The first apparatus is provided with: a memory for storing at least one high resolution image data by a unit of picture plane on the basis of a record control signal; a device coupled to the memory, for dividing and converting the high resolution image data stored in the memory into a plurality of standard image data corresponding to a standard television system one after another; a recording device coupled to the dividing and converting device, for recording the plurality of standard image data to the recording medium by a unit of field or frame; and a control device for generating the record control signal, which corresponds to the predetermined timing of the high resolution image data.

According to the present invention, the above mentioned object can be also achieved by a second apparatus for reproducing high resolution image data. The second apparatus is provided with: a recording medium of random access type for storing a plurality of standard image data corresponding to a standard television system by a unit of field or frame, the standard image data being recorded by dividing and converting at least one high resolution image data by a unit of picture plane into the plurality of standard image data: a reproducing device for reproducing the plurality of standard image data corresponding to the high resolution image data from the recording medium; and a plurality of store memories coupled to the reproducing device, for storing and outputting the reproduced standard image data by the unit of field or frame.

According to the present invention, the above mentioned object can be also achieved by a third apparatus for reproducing high resolution image data. The third apparatus is provided with: a recording medium of random access type for storing a plurality of standard image data corresponding to a standard television system by a unit of field or frame, the standard image data being recorded by dividing and converting at least one high resolution image data by a unit of picture plane into the plurality of standard image data: a reproducing device for reproducing the plurality of standard image data from the recording medium; a device for synthesizing and converting the plurality of standard image data, which are reproduced on the basis of a reproduction control signal, into one high resolution image data, one after another; a store memory for storing and outputting the high resolution image data outputted from the synthesizing and converting device by the unit of field or frame; and a reproduction control device for generating the reproduction control signal corresponding to an output timing of the high resolution image data.

According to the present invention, the above mentioned object can be also achieved by a first method of recording high resolution image data, which is inputted from the external, to a recording medium of random access type. The first method includes the steps of: storing at least one high resolution image data by a unit of picture plane; dividing and converting the stored high resolution image data into a plurality of standard image data corresponding to a standard television system one after another; and recording the plurality of standard image data to the recording medium by a unit of field or frame.

According to the present invention, the above mentioned object can be also achieved by a second method of reproducing high resolution image data from a recording medium of random access type for storing a plurality of standard image data corresponding to a standard television system by a unit of field or frame, the standard image data being recorded by dividing and converting at least one high resolution image data by a unit of picture plane into the plurality of standard image data. The second method includes the steps of: reproducing the plurality of standard image data from the recording medium; storing and outputting the reproduced standard image data by the unit of field or frame for each of the divided picture plane; and displaying the outputted standard image data on a plurality of display devices of the standard television system each corresponding to the divided picture plane.

According to the present invention, the above mentioned object can be also achieved by a third method of reproducing high resolution image data from a recording medium of random access type for storing a plurality of standard image data corresponding to a standard television system by a unit of field or frame, the standard image data being recorded by dividing and converting at least one high resolution image data by a unit of picture plane into the plurality of standard image data. The third method includes the steps of: reproducing the plurality of standard image data from the recording medium; synthesizing the reproduced plurality of standard image data to one high resolution image data one after another; storing and outputting the synthesized high resolution image data by the unit of field or frame; and displaying the outputted high resolution image data on one high resolution display device.

According to the first apparatus of the present invention, the control device generates the record control signal corresponding to the input timing of the high resolution image data, and outputs it to the memory. The memory stores the high resolution image data inputted from the external, by a unit of picture plane, on the basis of the record control signal. The dividing and converting device converts one or more than one of the high resolution image data stored in the memory, one after another into the plurality of standard image data corresponding to the standard television system. Then, the dividing and converting device outputs them to the recording device. Thereby, the recording device records the plurality of standard image data one after another to the recording medium of random access type by a unit of field or frame.

Therefore, the high resolution image can be easily recorded by use of the recording apparatus of the standard television system according to the first apparatus.

According to the first method of the present invention, the same advantageous effect as the first apparatus, can be also achieved.

According to the second apparatus, the recording medium is the random access type, and is recorded with one or more than one of the high resolution image data, in the form of the plurality of standard image data corresponding to the standard television system, by a field unit or a frame unit. The reproducing device reproduces the plurality of standard image data corresponding to the high resolution image data, from the recording medium. The store memories store the reproduced standard image data by a field unit or a frame unit, and output them, respectively.

Therefore, by employing a plurality of reproducing apparatuses of the standard television system in combination, it is possible to reproduce the high resolution image, according to the second apparatus.

According to the second method of the present invention, the same advantageous effect as the second apparatus, can be also achieved.

According to the third apparatus, the recording medium is the random access type, and is recorded with one or more than one of the high resolution image data in the form of the plurality of standard image data corresponding to the standard television system, by a field unit or a frame unit. The reproducing device reproduces from the recording medium, the plurality of standard image data. On the other hand, the reproduction control device generates the reproduction control signal corresponding to the output timing of the high resolution image data, and outputs it to the synthesizing and converting device. On the basis of this reproduction control signal, the synthesizing and converting device synthesizes the plurality of reproduced standard image data into one high resolution image data, one after another, and output it to the store memory. The store memory stores the high resolution image data outputted from the synthesizing and converting device, by a field unit or frame, and outputs it.

Therefore, it is possible to display the high resolution image on a high resolution display device, by use of a reproducing apparatus of standard television system, according to the third apparatus.

According to the third method of the present invention, the same advantageous effect as the third apparatus, can be also achieved.

As mentioned above, according to the present invention, the whole construction of the apparatus can be made simplified, and thus the cost can be reduced.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 7 is an outline constitution block diagram of a high resolution image reproducing unit of a second embodiment.

DETAILED DESCRIPTION OF THE PREFERRED EMBODIMENTS

Nextly, preferred embodiments of the present invention will be explained with reference to FIGS. 1 to 7.

First Embodiment

Figure 1:
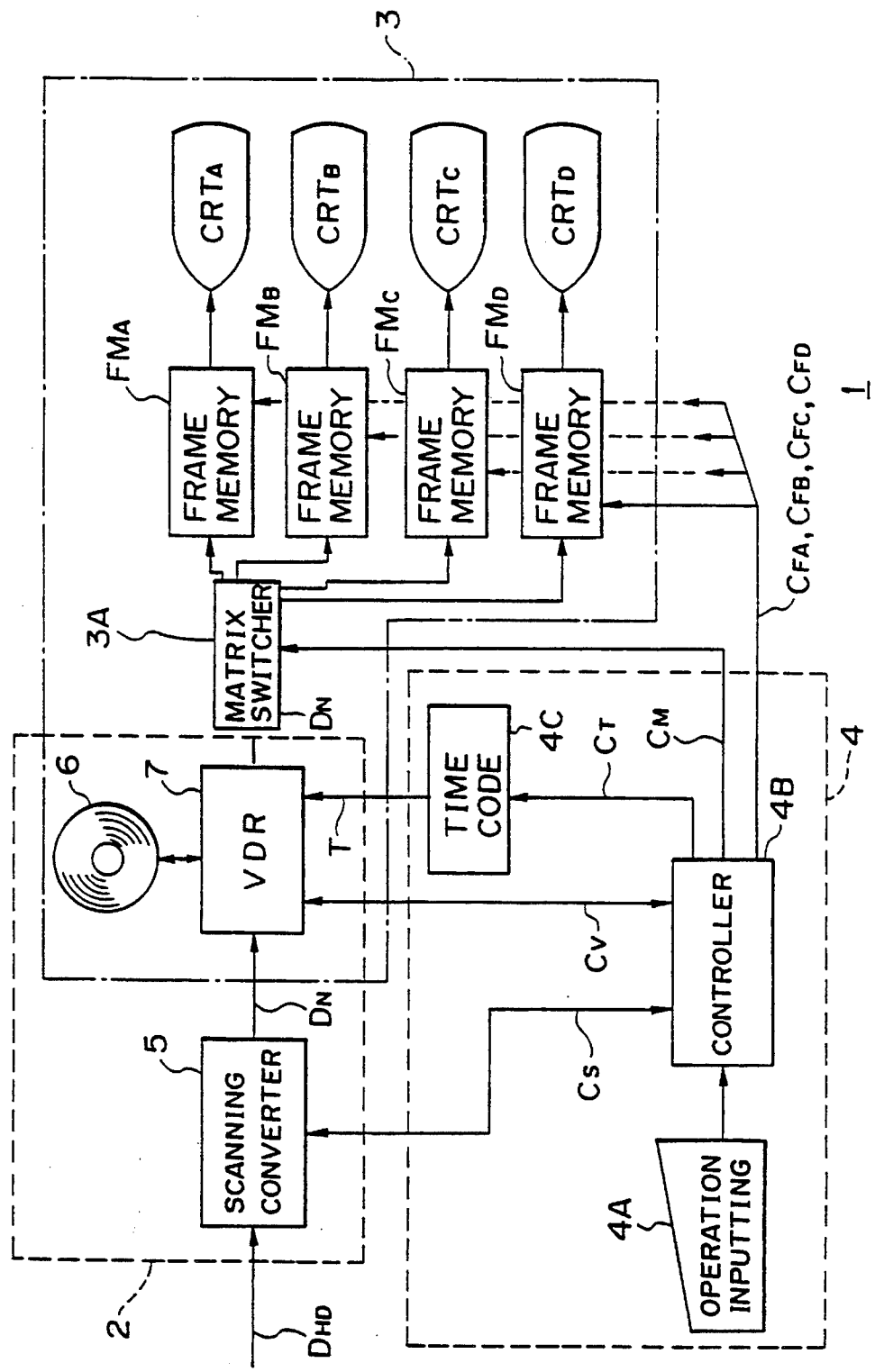
FIG. 1 is an outline constitution block diagram of a high resolution image recording and reproducing apparatus of a first embodiment.

FIG. 1 is a block diagram showing an outline of a high resolution image recording and reproducing apparatus of a first embodiment. It will be explained hereinbelow a case of recording and reproducing by dividing one high resolution picture plane (1024×512 dots) into four picture planes of the standard television system (512×256 dots: it is defined as a standard picture plane).

In FIG. 1, a high resolution image recording and reproducing apparatus 1 is provided with a high resolution image recording unit 2 which records a high resolution image, a high resolution image reproducing unit 3 which reproduces the recorded high resolution image, and an operation controlling unit 4 which operates and controls the whole apparatus.

In this embodiment, the high resolution image recording unit 2 and the high resolution image reproducing unit 3, share a video disc recorder 7 (hereinbelow, it is referred to as a VDR 7) which records the high resolution image data onto the video disc 6 (hereinbelow, it is referred to as a VD 6) as the data of the standard television system. Here, the VDR 7 has the function of recording and reproducing arbitrarily (i.e. randomly accessing) the record position of the frame number given to the VD beforehand.

The high resolution image recording unit 2 has a scanning converter 5 and the VDR 7.

The scanning converter 5 converts the inputted high resolution image data DHD (including the digital RGB data for 1024×512 dots, the horizontal synchronous data H and the vertical synchronous data V), into the standard image data DN, such as the analog RGB signal (equivalent to 512×256 dots), the horizontal synchronous signal and the vertical synchronous signal of the standard television system, for example, of the NTSC system, and outputs the data DN as the conversion result to the VDR 7. The VDR 7 records the outputted data DN of the scanning converter 5 onto the VD 6 one after another.

Figure 2:
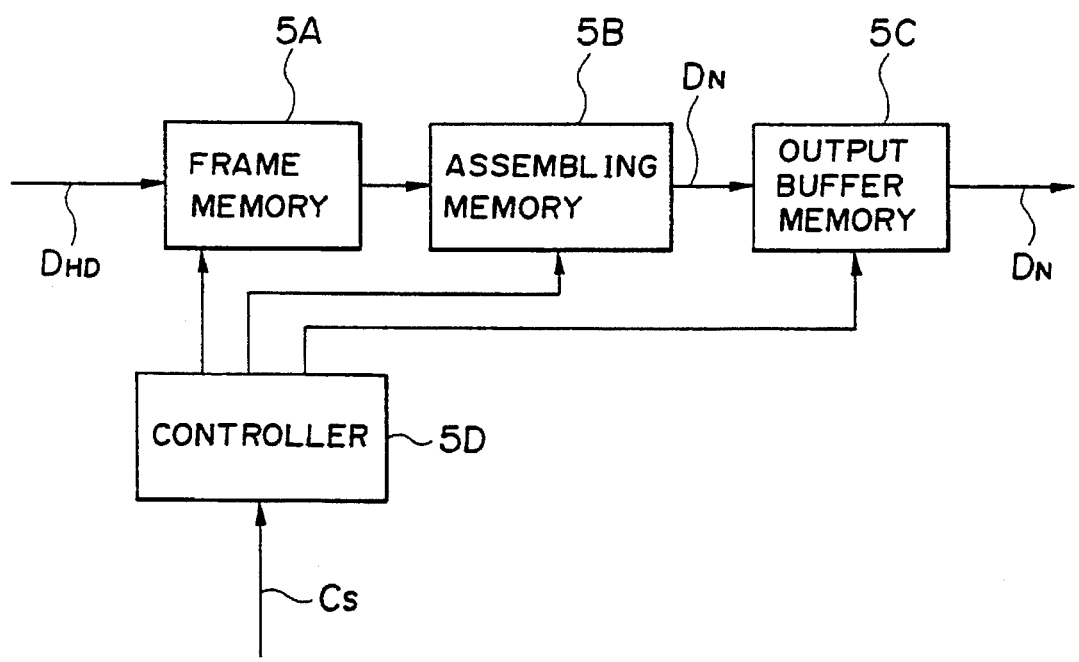
FIG. 2 is an outline constitution block diagram of a scanning converter in the first embodiment.

As shown in FIG. 2, the scanning converter 5 has a frame memory 5A, an assembling memory 5B, an output buffer memory 5C, and a controller 5D. The frame memory 5A stores the high resolution image data DHD by a unit of frame. The assembling memory 5B is adapted to cut out a portion of the high resolution image data DHD stored in the frame memory 5A, and assemble the standard image data DN. The standard image data DN assembled in the assembling memory 5B, is transmitted to the output buffer memory 5C. The output buffer memory 5C holds the data DN until it is taken into the VDR 7. The controller 5D controls each memory 5A, 5B and 5C.

In FIG. 1 again, the high resolution image reproducing unit 3 has four frame memories $FM_A$, $FM_B$, $FM_C$ and $FM_D$, a matrix switcher 3A, and four CRT (Cathode Ray Tube) display units $CRT_A$, $CRT_B$, $CRT_C$ and $CRT_D$.

The frame memories $FM_A$, $FM_B$, $FM_C$ and $FM_D$ store the standard image data DN of the standard television system which is the reproduction output of the VDR 7, by a unit of frame. The matrix switcher 3A outputs the standard image data DN outputted from the VDR 7, selectively to each frame memory $FM_A$, $FM_B$, $FM_C$ and $FM_D$. The CRT display units $CRT_A$, $CRT_B$, $CRT_C$ and $CRT_D$ are connected to each frame memory $FM_A$, $FM_B$, $FM_C$ and $FM_D$, respectively, each of which displays the picture by the standard television system.

Figure 3:
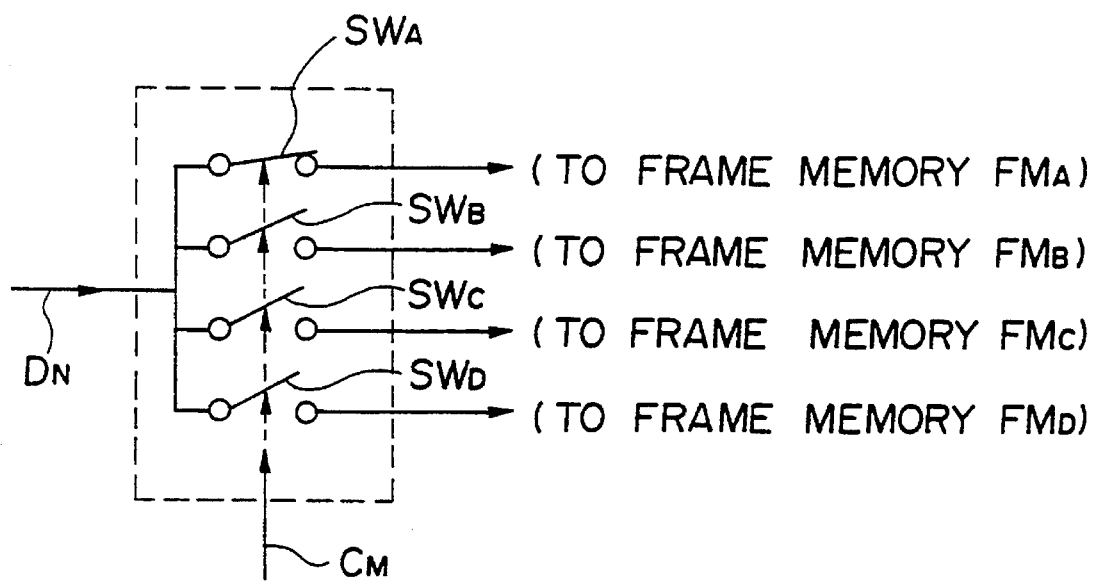
FIG. 3 is an outline constitution block diagram of a matrix switcher of the first embodiment.

As shown in FIG. 3, the matrix switcher 3A has four switches $SW_A$, $SW_B$, $SW_C$ and $SW_D$. Each of the switches $SW_A$, $SW_B$, $SW_C$ and $SW_D$ is turned on/off by a control signal CM from a controller 4B of the operation controlling unit 4. Thereby, the matrix switcher 3A outputs the standard image data DN selectively to the frame memories $FM_A$, $FM_B$, $FM_C$ and $FM_D$.

As shown in FIG. 1, the operation controlling unit 4 has an operation inputting unit 4A, the controller 4B, and a time code generating unit 4C.

The operation inputting unit 4A gives various operation and instruction data. The controller 4B controls the record timing or the reproduction timing, and controls the whole apparatus. The time code generating unit 4C outputs the time code T to the VDR 7 on the basis of the control signal CT from the controller 4B. The time code T includes the time information which indicates, for example, what frame, at what time, what minute and what second.

Nextly, the recording operation and the reproducing operation of the high resolution image recording and reproducing apparatus, will be separately explained.

1) At the Time of Recording

Figure 4A:
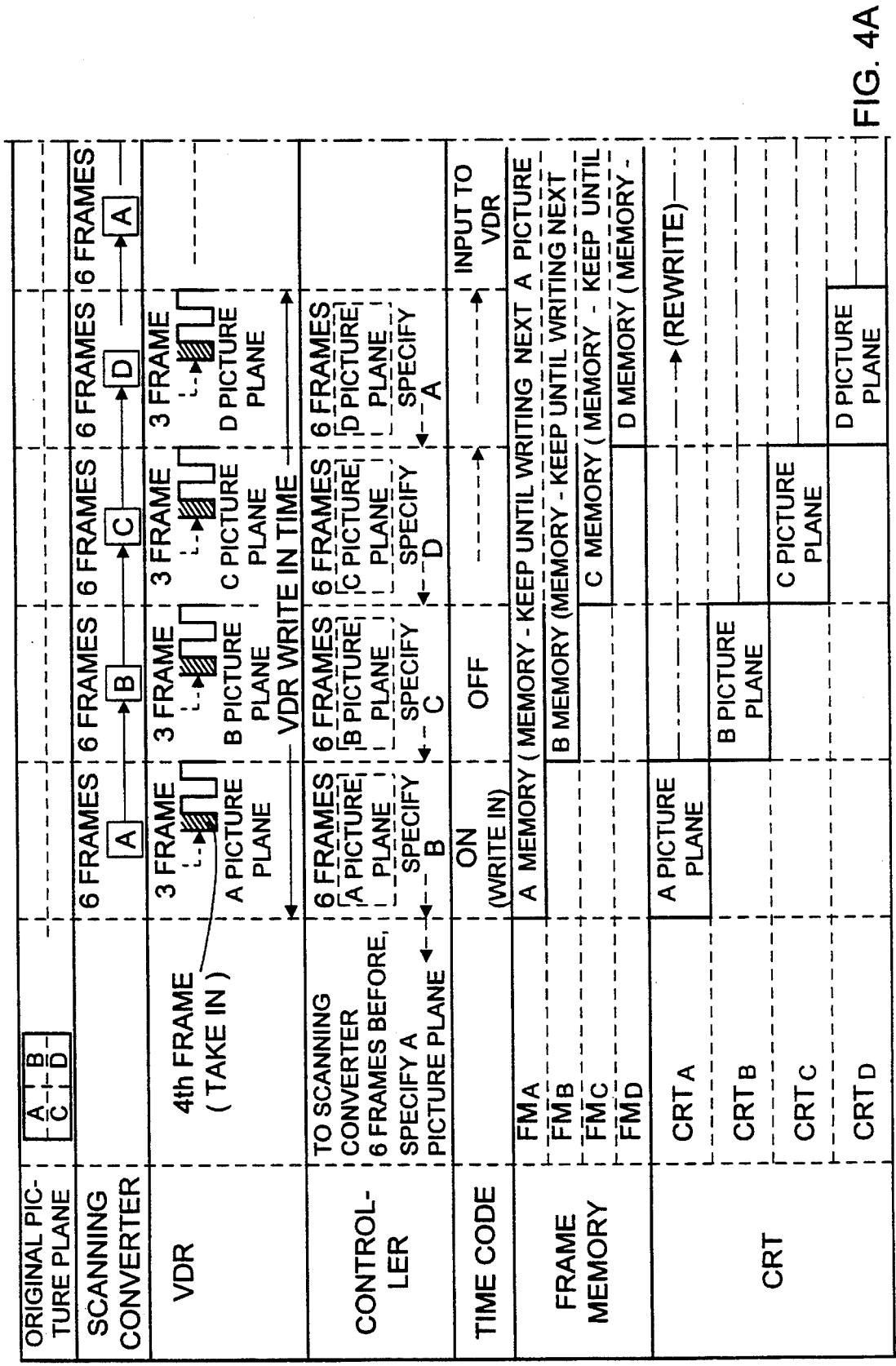
FIGS. 4A and 4B are parts of a timing chart at the time of recording operation of the first embodiment.
Figure 4B:
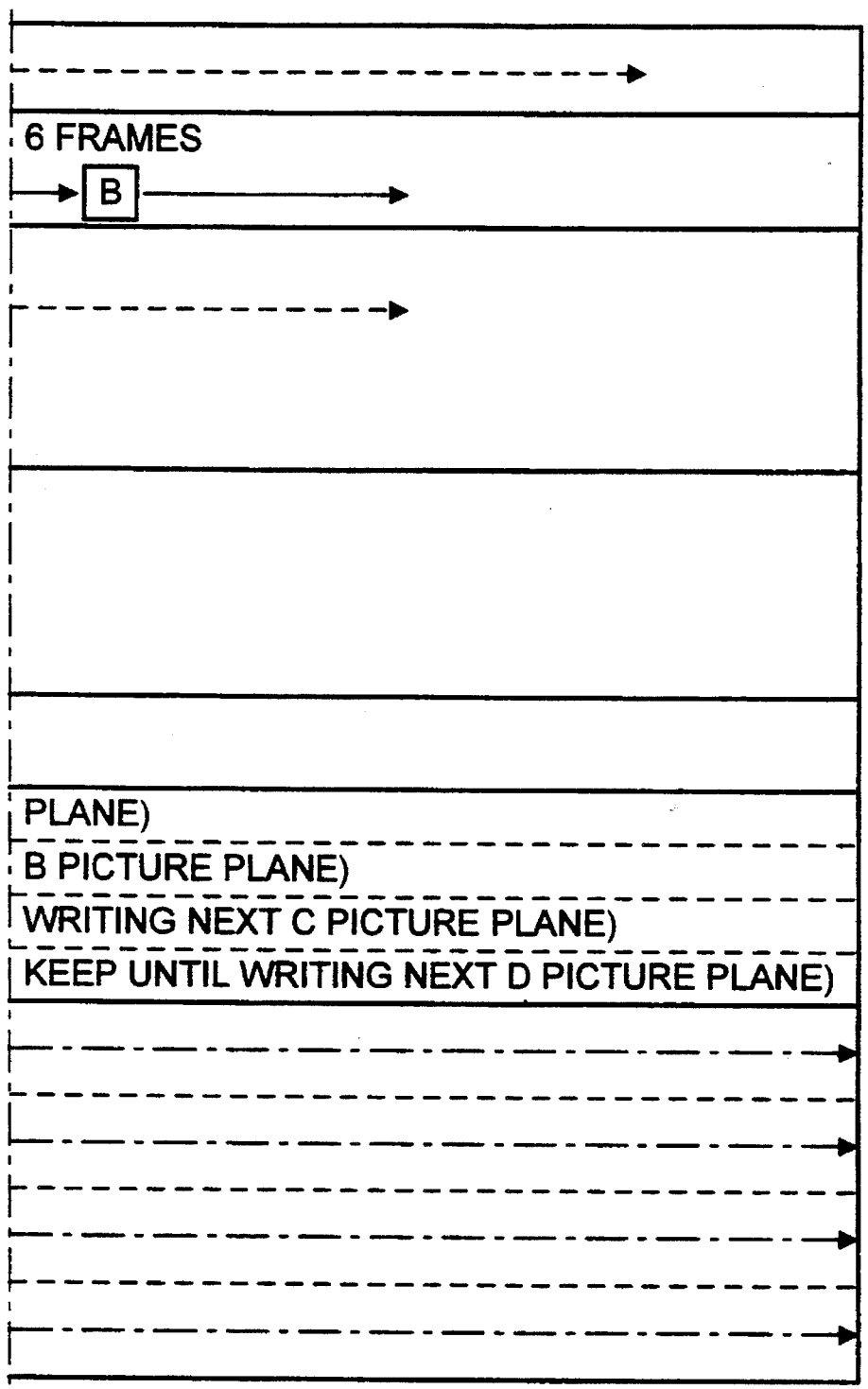
Figure 6:
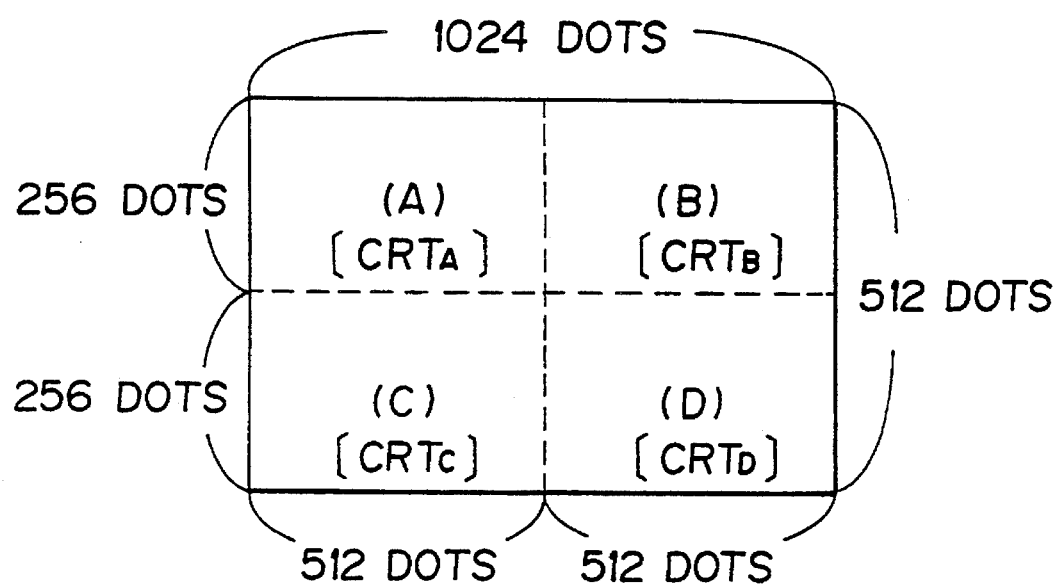
FIG. 6 is a figure for explaining a condition of the divided picture planes in the first embodiment.

The timing chart at the time of recording is shown in FIG. 4. In this case, it is assumed that the time required for the scanning converter 5 to cut out one standard image data DN from the high resolution image data DHD, is equal to the time corresponding to 6 frames of the original high resolution picture plane (image data). It is also assumed that the high resolution picture plane consists of 1024×512 dots as shown in FIG. 6, and the recording operation is performed by dividing the picture plane into four standard picture planes A, B, C and D, each consists of 512×256 dots. Namely, it is assumed here, that it needs 24 frames to record one high resolution picture plane. In addition, it is assumed that the time required to reproduce 1 frame of the original high resolution picture plane is equal to the time required to reproduce 1 frame of the standard picture plane (i.e. 1/30 seconds).

Firstly, the scanning converter 5 keeps on taking the high resolution image data DHD one after another into its internal frame memory 5A. The controller 4B calculates beforehand the time corresponding to 6 frames, which is the time required to cut out the standard image data DN, and to the controller 5D of the scanning converter 5, outputs a control signal CS, which indicates the cutting out operation of the standard picture plane A, according to the result of the calculation. By the control signal CS which is the cutting out order of this standard picture plane A, the controller 5D of the scanning converter 5 cuts out the standard image data DN, which corresponds to the standard picture plane A, from the high resolution picture plane data DHD of the frame, which is stored in the frame memory 5A at the present time, by use of the assembling memory 5B. The cutting out operation of the standard picture plane A, is completed when the time corresponding to 6 frames is elapsed after the output of the control signal CS, which is the cutting out order. Then, the controller 5D transmits the data contents of the assembling memory 5B to the output buffer memory 5C.

At this time, the controller 4B instructs the VDR 7, by a control signal CV, to record the standard image data DN, which corresponds to the standard picture plane A, to the recording position of the predetermined frame number of the VD 6. Thereby, the VDR 7 records to the VD 6 the content of the output buffer memory 5c i.e. the standard image data DN, which corresponds to the standard picture plane A. In this case, the record frame number of the standard image data DN corresponding to the standard picture plane A in the VD 6 is defined as NA. The standard image data DN, which corresponds to the standard picture plane A, is recorded to the recording position having the record frame number NA, which is expressed by the following expression.

$$NA=4n+1 \ (n=0, 1, 2, 3, \ldots)$$

In this case, the standard image data DN corresponding to the standard picture plane A, is held by the output buffer memory 5C for the time corresponding to 6 frames. The VDR 7 calculates the access time beforehand, and, as indicated by hatching in FIG. 4, takes the fourth frame of the standard image data DN. Accordingly, it becomes possible to certainly take desired standard image data DN into the VDR 7. At this time, the controller 4B outputs a control signal CT to the time code generating unit 4C. The control signal CT is a signal for writing the time code T as one of other data to be recorded with the image data DN. The controller 4B directs the VDR 7 to record the time code T including the time information etc. into the VD 6. As the result, the random reproduction can be also easily performed by using this recorded time code T.

In parallel to this process, when it has elapsed the time corresponding to 6 frames after having outputted the control signal CS which is the cutting out order of the standard picture plane A, the controller 4B outputs the control signal CS, which is the cutting out order of the standard picture plane B, to the controller 5D. Thereby, the scanning converter 5 cuts out the standard picture plane B by use of the assembling memory 5B, from the high resolution image data DHD of the frame which is presently stored in the frame memory 5A, after it finishes cutting out the standard picture plane A. When it finishes recording the standard picture plane A to the VD 6 and cutting out the standard picture plane B, the controller 5D transmits the content of the assembling memory 5B to the output buffer memory 5C. Thereby, the VDR 7 records the content of the output buffer memory 5C onto the VD 6. In this case, the record frame number of the standard image data DN which corresponds to the standard picture plane B of the VD 6, is expressed by NB. The standard image data DN of the standard picture plane B is recorded at the record position having the record frame number of NB, which is expresses by the following expression.

$$NB=4n+2 \ (n=0, 1, 2, 3, \ldots)$$

After this, the standard picture planes C and D are cut out one after another, and are recorded onto the VD 6 by the VDR 7, in the same manner.

In this case, the record frame numbers NC and ND of the standard image data DN for the standard picture planes C and D, become as following, respectively.

$$NC=4n+(n=0, 1, 2, 3, \ldots)$$

$$ND=4n+4 \ (n=0, 1, 2, 3, \ldots)$$

In this case, four standard picture planes cut out respectively from the high resolution picture plane in every 6 frames, are recorded at the record position expressed by the same n. Thereby, a dynamic high resolution picture plane can be easily reproduced by use of the record frame number.

For example, if it is controlled such that the taking-in timing of the high resolution image data DHD of the frame memory 5A is restricted to only the time of ordering the cutting out operation of the standard picture plane A, for example, and that the same high resolution image data DHD is held at other times, four standard image data are made to be data of the same time. Therefore, the high resolution picture plane of this time can be precisely reproduced. This may be selected according to the usage.

Furthermore, in parallel to this process, the controller 4B outputs the standard image data DN, which is outputted from the scanning converter 5 through the VDR 7, directly to the matrix switcher 3A. Thereby, the matrix switcher 3A outputs and writes the standard picture plane data of the standard picture planes A, B, C and D to the frame memories $FM_A$, $FM_B$, $FM_C$ and $FM_D$, respectively. As a result, the pictures under the process of recording to the VD 6, are displayed one after another on the $CRT_A$, $CRT_B$, $CRT_C$, and $CRT_D$ while the controller 4B controls the frame memories $FM_A$, $FM_B$, $FM_C$ and $FM_D$ by the control signals $CF_A$, $CF_B$, $CF_C$ and $CF_D$, so that the recording condition can be easily checked in the real time manner.

2) At the Time of Reproducing

Figure 5A:
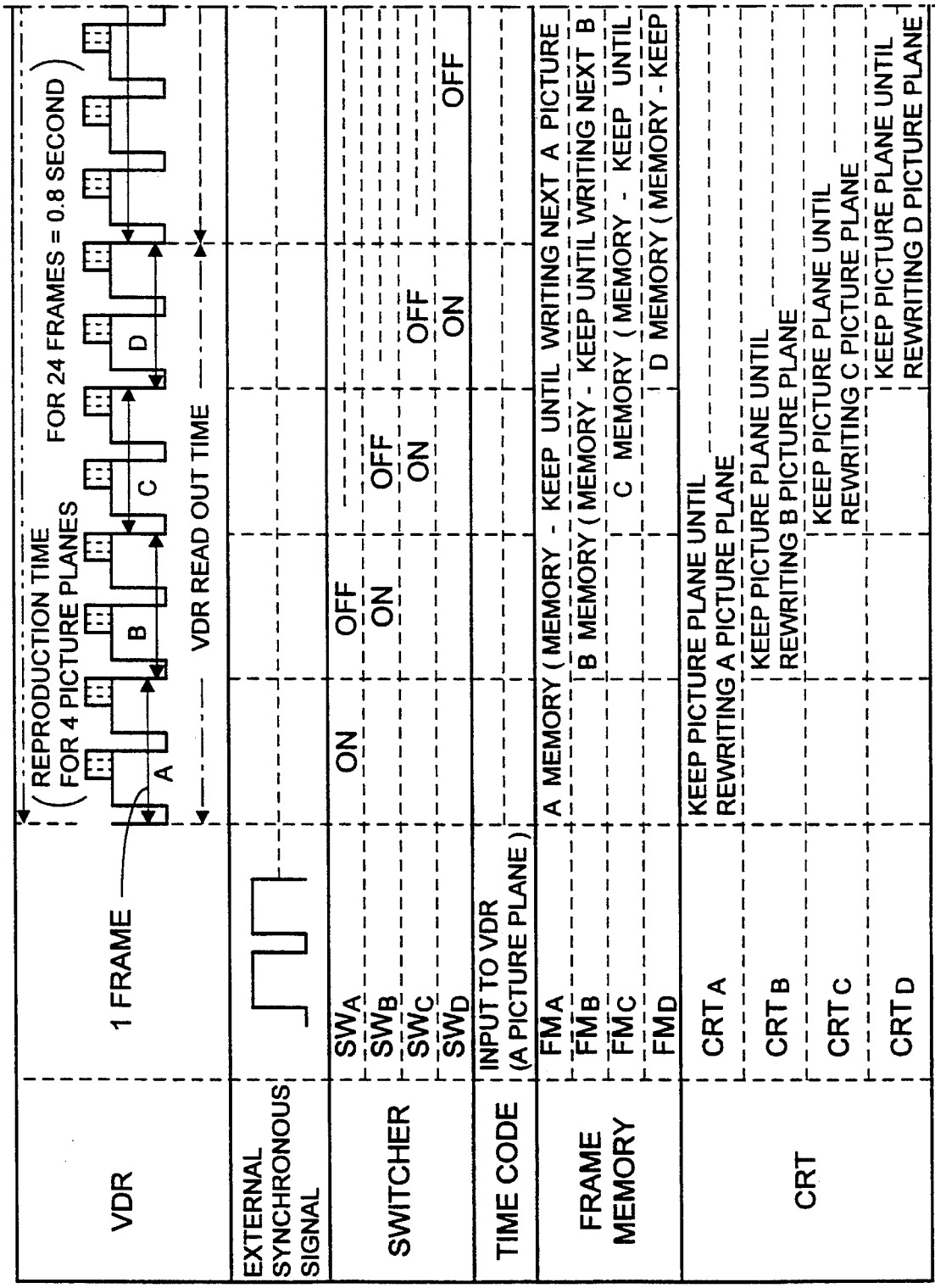
FIGS. 5A and 5B are parts of a timing chart at the time of reproducing operation of the first embodiment.
Figure 5B:
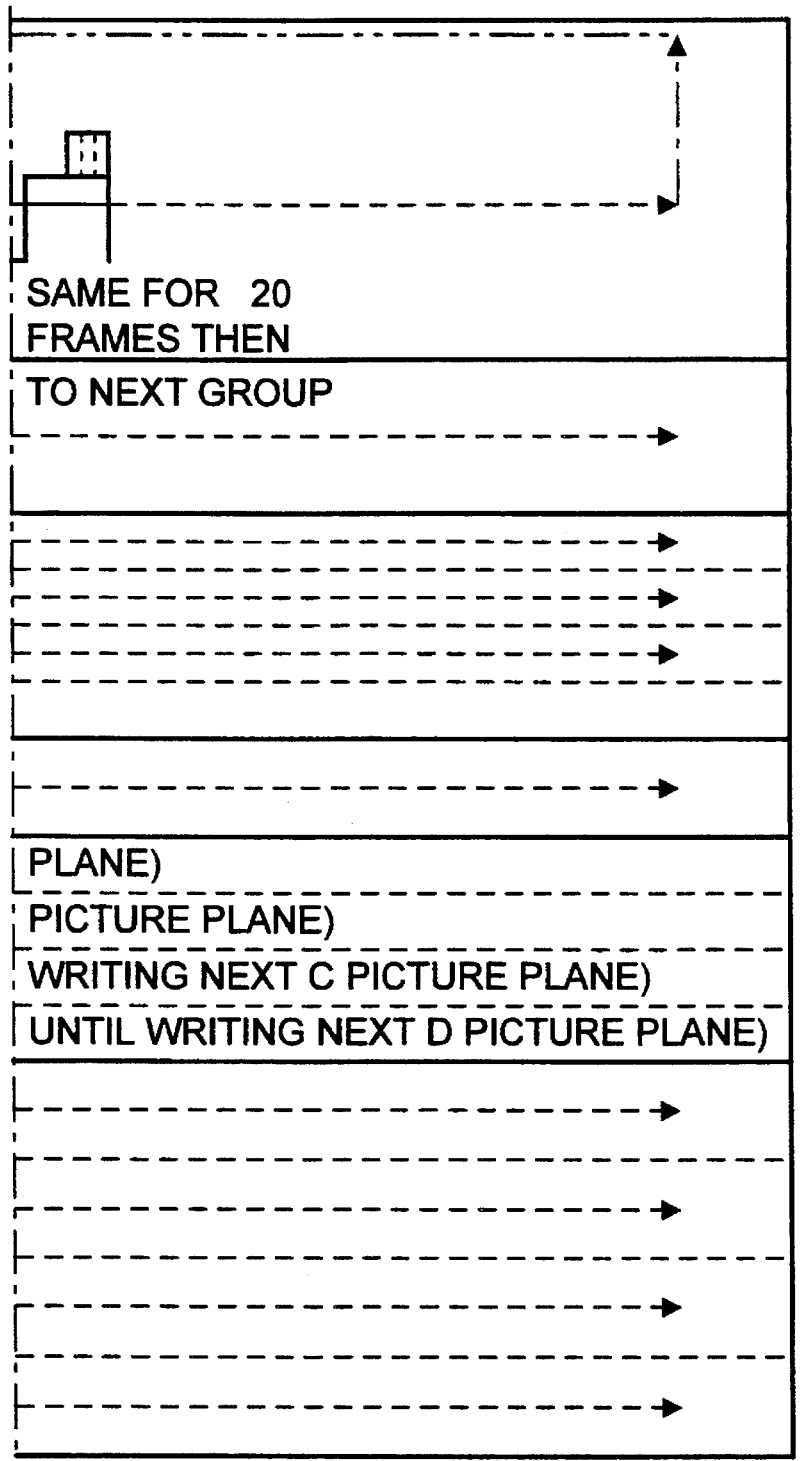

FIG. 5 is a timing chart at the time of reproducing. In this example, one set of four picture planes are reproduced in the time corresponding to 24 frames so as to match the recording time. For this reason, the control may be performed such that, after continuously reproducing one set of four frames, it moves the operation to the A frame of the next group, after continuing the reproduction of the standard picture plane D for 20 frames. Here, each frame may be controlled to be reproduced by a unit of 6 times.

Firstly, the controller 4B controls the VDR 7 by the control signal CV, so that the VDR 7 reproduces the recording position of the recording frame number N, which is expressed by the following expression.

$$N=4n+1 \ (n=0, 1, 2, 3, \ldots)$$

Thereby, the standard image data DN corresponding to the standard picture plane A is reproduced. The switch $SW_A$ corresponding to the frame memory $FM_A$ of the matrix switcher 3A is changed to the ON condition. Other switches $SW_B$ to $SW_D$ are kept to be in the OFF conditions. Thereby, data of the standard picture plane A is written into the frame memory $FM_A$. As the result, the standard picture plane A is displayed on the $CRT_A$. Data of the standard picture plane A written in this frame memory $FM_A$, is held until the rewriting timing (i.e. until the time when it has elapsed the time to reproduce four standard picture planes in the VDR) of the standard picture plane A for the next time.

Nextly, the controller 4B controls the VDR 7 by the control signal CV, so that the VDR 7 reproduces the record position of the frame number N, which is expressed by the following expression.

$$N=4n+2 \ (n=0, 1, 2, 3, \ldots)$$

Thereby, data of the standard picture plane B is reproduced. The switch $SW_B$ corresponding to the frame memory $FM_B$ of the matrix switcher 3A, is changed into the ON condition. Other switches $SW_A$, $SW_C$ and $SW_D$ are kept to be in the OFF conditions. Thereby, data of the standard picture plane B is written in the frame memory $FM_B$. As the result, the standard picture plane B is displayed on the $CRT_B$. Data of the standard picture plane B written in this frame memory $FM_B$, is held until the rewriting timing of the standard picture plane B for the next time, in the same manner.

The controller 4B controls the VDR, so that the VDR reproduces data of the standard picture planes C and D one after another, in the same manner. The VDR writes the data into the frame memories $FM_C$ and $FM_D$ respectively, and displays the data on the $CRT_C$ and $CRT_D$, respectively. At this time, one high resolution picture plane is displayed over four CRTs i.e. $CRT_A$ to $CRT_D$ by arranging $CRT_A$ to $CRT_D$ in the matrix manner, as shown in FIG. 6.

In this way, the high resolution picture plane can be displayed without degrading the picture quality, by use of the four CRTs of the standard television system.

In case of a still picture, the present embodiment can reproduce the picture of high resolution, without degradation of the picture quality or miss of the picture. As aforementioned, in case of dividing the picture plane by four, the present embodiment can reproduce the semi-dynamic picture, which changes at a rate of 1 time for every 24/30 second, without degradation of the picture quality or miss of the picture. In the same manner, in case of dividing the picture plane by X, the present embodiment can reproduce the semi-dynamic picture, which changes at a rate of 1 time for every 6X/30 second, without degradation of the picture quality or miss of the picture. Accordingly, in case that the picture plane of the computer graphics (1024×512 dots) gradually changes several times per second, it becomes possible to carry out the backup for a predetermined time so as to enable the reproduction (replay) of the display picture plane. More concretely, for example, in the system which carries out the concentration management of the flow of commodities, it becomes possible to carry out the backup of the picture plane of graphics which represents controlling condition of the flow of commodities for the verification at the accident.

In this kind of usage, there is no necessity to record and reproduce the perfect dynamic pictures. However, since it is necessary to read and judge characters etc., the same resolution as the original picture plane is required. Therefore, in this case, the high resolution image recording and reproducing apparatus of the present embodiment is still quite effective. Namely, as compared with the conventional apparatus, which carries out the record and reproduction of the high resolution picture (dynamic picture) by the format as it is, or the recording and reproducing method by use of the apparatuses of the standard television system of the number equal to the number of the divisions, the present embodiment is quite advantageous in the simple construction of the apparatus, and thus reduction in cost, while enabling the quick reproduction.

Second Embodiment

The first embodiment displays the high resolution image data DHD (for four picture planes of the standard image data DN) recorded in the VD 6, by use of four CRTs of the standard television system. On the contrary to that, the second embodiment carries out the reproduction and display of the high resolution image data DHD (for four picture planes of the standard image data DN) recorded in the VD 6, by use of one high resolution CRT.

The explanation hereinbelow, will be done mainly with respect to a high resolution image reproducing unit 30 (FIG. 7), which is different from the high resolution image reproducing unit 3 (FIG. 1) of the first embodiment, for simplification of explanation, while, with respect to other constitutional elements, the explanations will be done by using the constitution of the first embodiment (i.e. the high resolution image recording unit 2, the operation controlling unit 4). Namely, in FIG. 7, the same constitutional elements as those in the first embodiment carry the same reference numerals and the detailed explanations thereof are omitted.

In FIG. 7, the high resolution image reproducing unit 30 has a VDR 7, a picture plane synthesizing circuit 10, a first memory 11, a second memory 12, a selector 13, and a high resolution CRT 14.

The VDR 7 records the data DHD from the scanning converter 5 to the VD 6 one after another. The picture plane synthesizing circuit 10 is adapted to synthesize the standard image data DN of the standard television system for four picture planes (frames), which are reproduced by the VDR 7, so as to write a synthesized data as the high resolution image data DHD into the first memory 11 or the second memory 12. The first memory 11 and the second memory 12 store the high resolution image data DHD by a unit of frame, respectively. The selector 13 is adapted to selectively output the high resolution image data DHD from the first memory 11 or the second memory 12 on the basis of the selection signal CSE from the picture plane synthesizing circuit 10. There may be also a case that the selector 13 outputs neither of them. The high resolution CRT 14 is adapted to display a high resolution picture plane.

Nextly, the operation of the high resolution image reproducing unit 30 will be explained. Here, it is assumed that the selector 13 outputs neither of the data of the first memory 11 or the second memory 12, by the selection signal CSE in the initial state.

Firstly, the controller 4B controls the VDR 7 by the control signal CV, so that the VDR 7 reproduces the recording position of the recording frame number N, which is expressed by the following expression.

$$N = 4n+1 \ (n=0, 1, 2, 3, \ldots)$$

At the same time, the picture plane synthesizing circuit 10 outputs a portion of the high resolution image data DHD to the first memory 11 on the basis of the standard image data DN corresponding to the reproduced standard picture plane A. In the same manner, the picture plane synthesizing circuit 10 reproduces the continuous recording positions. When the reproduction of four continuous recording positions (frame number N=4n+i:i=1, 2, 3, 4) is completed, i.e., the reproduction of four standard picture planes A, B, C, and D is finished, the high resolution image data DHD corresponding to one high resolution picture plane is synthesized in the first memory 11. When the synthesizing process of one high resolution image data DHD is completed, the picture plane synthesizing circuit 10 outputs the selection signal CSE to the selector 13. The selector 13 is switched to the side for outputting the memory data (=high resolution image data DHD) of the first memory 11.

Thereby, the high resolution image data DHD is outputted to the high resolution CRT 14 through the selector 13. Accordingly, the high resolution picture plane same as the high resolution picture plane before recording to the VD 6, can be reproduced without degrading the picture plane.

In parallel to this process, the controller 4B controls the VDR 7, so that the VDR 7 reproduces the recording position of the recording frame number N, which is expressed by the following expression.

$$N = 4(n+1)+1 \ (n=0, 1, 2, 3, \ldots)$$

Namely, the VDR 7 reproduces the standard picture plane A' corresponding to the high resolution picture plane nextly recorded. At this time, the picture plane synthesizing circuit 10 outputs the high resolution image data DHD to the second memory 12 on the basis of the standard image data DN of the reproduced standard picture plane A'. In the same manner, the continuous record positions (frame number N=4 (n+1)+I:i =1, 2, 3, 4) are reproduced. When the four continuous record positions are completed, i.e., when the reproduction of four standard picture planes A', B', C', and D' are finished, the high resolution image data DHD' corresponding to the next one high resolution picture plane, is synthesized in the second memory 12. When the synthesizing process of the high resolution image data DHD' is completed, the picture plane synthesizing circuit 10 outputs the selection signal CSE to the selector 13. The selector 13 is switched to the side for outputting the memory data (=high resolution image data DHD') of the second memory 12. Thereby, the high resolution image data DHD' of the second memory 12 is outputted to the high resolution CRT 14 through the selector 13. In this way, the high resolution picture plane can be reproduced on the high resolution CRT 14 one after another by use of the first memory 11 and the second memory 12.

As described above in detail, according to the second embodiment, the high resolution picture plane is recorded, by use of the recording medium and the recording and reproducing apparatus of the standard television system, such as NTSC system, while the original high resolution picture plane can be nonetheless reproduced by the high resolution CRT, resulting in the great advantages of simplifying the whole construction of the apparatus and reducing the cost of the apparatus. Moreover, the apparatus according to the second embodiment can be miniaturized, compared with the first embodiment, since only one CRT is required.

According to the above mentioned embodiments, one high resolution picture plane is processed in a time divisional manner, and recorded and reproduced in a randomly accessed manner, so that the record and reproduction of the high resolution picture plane, can be performed by use of only one set of the recording medium and the recording and reproducing apparatus of the standard television system.

Although only one VDR is employed in each of the above embodiments, it is possible to perform the continuous record and reproduction for a long time period, by connecting a plurality of the VDRs and by switching them. Furthermore, the same effect can be achieved with respect to a recording medium, and a recording and reproducing apparatus, which can carry out the random accessing process, other than the VD and the VDR.

Although each of the above embodiments performs the process by a unit of frame, it is also possible to constitute the apparatus so as to perform the process by a unit of field. In this case, the apparatus may be preferably constituted, in case of dividing the high resolution picture plane by four, for example, so as to record onto the continuous recording positions of the recording medium in the order of the first field of the standard picture plane A, the first field of the standard picture plane B, the first field of the standard picture plane C, the first field of the standard picture plane D, the second field of the standard picture plane A, the second field of the standard picture plane B, the second field of the standard picture plane C, and the second field of the standard picture plane D.

Since in the present embodiment, the image is recorded to the recording medium in a unit of field or frame, it becomes possible to access and reproduce arbitrary fields or arbitrary frames. Moreover, the high resolution image can be reproduced by use of the reproducing apparatus of the standard television system, i.e. by connecting two or more display apparatuses of the standard television system and dividing it into a plurality of picture planes.

Furthermore, it becomes also possible to display the high resolution picture plane by just one high resolution display device without degrading the picture quality, even by use of the reproducing apparatus of the standard television system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for recording high resolution image data, which is successively inputted from the external at a predetermined timing, to a recording medium of a random access type, comprising:

a memory for successively storing one high resolution image data by a unit of picture plane at a timing based on a record control signal, which is cyclically inputted, such that said one high resolution image data is held by said memory for one cycle of the record control signal;

a converter coupled to said memory, for dividing said one high resolution image data stored in said memory into N portions corresponding to N divided contiguous areas of one picture plane and entirely converting only one of the N portions to standard image data corresponding to a standard television system and not converting any part of the remaining portions, such that said converted one of the N portions is sequentially shifted each time when said one high resolution image data is held, and that N standard image data, which are successively converted during a time interval corresponding to N cycles of the record control signal, cover one picture plane in a time divisional manner;

a recording device coupled to said converter, for recording the standard image data to the recording medium by a unit of field or frame; and a control device for generating the record control signal by the cycle which prescribes said predetermined time interval to be enough for said memory, said converter and said recording device to respectively perform storing, converting and recording operations with respect to said one portion of the high resolution image data.

2. An apparatus according to claim 1, wherein said converter comprises a scanning converter for cutting out a portion of the high resolution image data and outputting the cut out portion as the standard image data.

3. An apparatus according to claim 1, wherein said recording device comprises a video disc recorder (VDR), and said recording medium comprises a video disc (VD).

4. An apparatus for recording high resolution image data, which is successively inputted from the external at a predetermined timing, to a recording medium of random access type, comprising:

a memory for storing one entire portion of a plurality of contiguous portions of the high resolution image data corresponding to one picture plane at a timing based on a record control signal, which is cyclically inputted, and not storing any part of any other portion of said plurality of contiguous portions of the high resolution image data following said one portion and corresponding to another picture plane, during a predetermined time interval based on a cycle of the record control signal;

a converter coupled to said memory, for dividing and converting said one portion of the high resolution image data stored in said memory into a plurality of standard image data corresponding to a standard television system one after another;

a recording device coupled to said converter, for recording the plurality of standard image data to the recording medium by a unit of field or frame; and a control device for generating the record control signal by the cycle which prescribes said predetermined time interval to be enough for said memory, said converter and said recording device to respectively perform storing, converting and recording operations with respect to said one portion of the high resolution image data.

5. An apparatus according to claim 4, wherein said converter comprises a scanning converter for cutting out a portion of the high resolution image data and outputting the cut out portion as the standard image data.

6. An apparatus according to claim 4, wherein said recording device comprises a video disc recorder (VDR), and said recording medium comprises a video disc (VD).

7. A method of recording high resolution image data, which is successively inputted from the external at a predetermined timing, to a recording medium of random access type, comprising the steps of:

successively storing into a memory one high resolution image data by a unit of picture plane at a timing based on a record control signal, which is cyclically inputted, such that said one high resolution image data is held by said memory for one cycle of the record control signal;

dividing said one high resolution image data stored in said memory into N portions corresponding to N contiguous divided areas of one picture plane, and entirely converting only one of the N portions to standard image data corresponding to a standard television system and not converting any part of the remaining portions, such that said converted one of the N portions is sequentially shifted each time when said one high resolution image data is held, and that N standard image data, which are successively converted during a time interval corresponding to N cycles of the record control signal, cover one picture plane in a time divisional manner;

recording the standard image data to the recording medium by a unit of field or frame; and generating the record control signal by the cycle which prescribes said predetermined time interval to be enough for said memory, said converter and said recording device to respectively perform storing, converting and recording operations with respect to said one portion of the high resolution image data.

8. A method of recording high resolution image data, which is successively inputted from the external at a predetermined timing, to a recording medium of random access type, comprising the steps of:

storing into a memory one entire portion of a plurality of contiguous portions of the high resolution image data corresponding to one picture plane at a timing based on a record control signal which is cyclically inputted, and not storing any part of any other portion of said plurality of contiguous portions of the high resolution image data following said one portion and corresponding to another picture plane, during a predetermined time interval based on a cycle of the record control signal;

dividing and converting said one portion of the high resolution image data stored in said memory into a plurality of standard image data corresponding to a standard television system one after another, by a converter;

recording the plurality of standard image data to the recording medium by a unit of field or frame, by a recording device; and generating the record control signal by the cycle which prescribes said predetermined time interval to be enough for said memory, said converter and said recording device to respectively perform storing, converting and recording operations with respect to said one portion of the high resolution image data.

* * * * *